(12) United States Patent
Thoma (10) Patent No.: US 9,469,369 B2
(45) Date of Patent: Oct. 18, 2016

(54) VEHICLE FRAME (75) Inventor: Vincenz Thoma, Koblenz (DE)

(73) Assignee: CANYON BICYCLES GMBH, Koblenz (DE)

(*) Notice: Subject to any disclaimer, the term of this patent is extended or adjusted under 35 U.S.C. 154(b) by 34 days.

(21) Appl. No.: 14/234,859

(22) PCT Filed: Aug. 6, 2012

(86) PCT No.: PCT/EP2012/065353
§ 371 (c)(1),
(2), (4) Date: Jan. 24, 2014

(87) PCT Pub. No.: WO2013/029928
PCT Pub. Date: Mar. 7, 2013

(65) Prior Publication Data
US 2014/0159338 A1 Jun. 12, 2014

(30) Foreign Application Priority Data
Aug. 30, 2011 (DE) .................... 20 2011 104 974 U (51) Int. Cl.
*B62K 1/00* (2006.01)
*B62K 25/12* (2006.01)
(Continued)

(52) U.S. Cl.
CPC ............... *B62K 25/12* (2013.01); *B62K 25/28* (2013.01); *B62K 25/286* (2013.01); *B62K 2025/048* (2013.01)

(58) Field of Classification Search
CPC ...... B62K 19/18; B62K 19/30; B62K 19/34; B62K 19/36; B62K 25/02; B62K 25/04; B62K 2201/02

USPC .......................................... 280/283, 284, 285
See application file for complete search history.

(56) References Cited

U.S. PATENT DOCUMENTS 2,283,671 A * 5/1942 Finlay et al. ................. 280/284
4,046,396 A   9/1977 Taylor et al.
(Continued)

FOREIGN PATENT DOCUMENTS

DE   3033294 A1   4/1981
DE   9116838 U1   3/1994
(Continued)

OTHER PUBLICATIONS

International Search Report dated Sep. 14, 2012 for PCT/EP2012/065353.

(Continued)

*Primary Examiner* — Joseph Rocca
*Assistant Examiner* — Conan Duda
(74) *Attorney, Agent, or Firm* — Ohlandt, Greeley, Ruggiero & Perle, LLP (57) ABSTRACT

A vehicle frame, in particular a mountain bike frame or a trekking bicycle frame, comprises main frame element. A rear frame is pivotably connected with the main frame element. A damping element is provided between the rear frame and the main frame element. A first connection point of the damper element is connected with the rear frame and a second connection point of the damping element is connected with the main frame element. For the purpose of changing the frame characteristics, a displacing element is provided for the displacement of the first connection point. The locking of the displacing element is done with the help of an actuator element.

18 Claims, 9 Drawing Sheets

(51) Int. Cl.
  *B62K 25/28* (2006.01)
  *B62K 25/04* (2006.01)

(56) References Cited

U.S. PATENT DOCUMENTS

| | | | | |
|---|---|---|---|---|
| 5,205,572 | A * | 4/1993 | Buell et al. | 280/284 |
| 5,226,674 | A * | 7/1993 | Buell et al. | 280/284 |
| 5,335,929 | A * | 8/1994 | Takagaki et al. | 280/283 |
| 5,452,910 | A * | 9/1995 | Harris | 280/284 |
| 5,553,881 | A * | 9/1996 | Klassen et al. | 280/284 |
| 5,628,524 | A * | 5/1997 | Klassen et al. | 280/284 |
| 5,649,693 | A * | 7/1997 | Busby et al. | 267/294 |
| 6,086,080 | A * | 7/2000 | Scheffer | 280/283 |
| 6,131,934 | A * | 10/2000 | Sinclair | 280/284 |
| 6,161,858 | A * | 12/2000 | Tseng | 280/281.1 |
| 6,783,142 | B1 * | 8/2004 | Schober | 280/284 |
| 6,840,528 | B2 * | 1/2005 | Malwitz | 280/283 |
| 6,877,591 | B1 | 4/2005 | Hso | |
| RE39,159 | E * | 7/2006 | Klassen et al. | 280/284 |
| 7,140,628 | B2 * | 11/2006 | Parkin | 280/281.1 |
| 7,712,757 | B2 | 5/2010 | Berthold | |
| 7,717,212 | B2 * | 5/2010 | Weagle | 180/227 |
| 8,458,080 | B2 * | 6/2013 | Shirai | 705/37 |
| 8,998,231 | B2 * | 4/2015 | Neeley | 280/124.16 |
| 2002/0117830 | A1 * | 8/2002 | Holt et al. | 280/283 |
| 2003/0038450 | A1 | 2/2003 | Lam | |
| 2003/0160421 | A1 * | 8/2003 | Assier | 280/283 |
| 2004/0094933 | A1 | 5/2004 | Probst | |
| 2006/0061059 | A1 | 3/2006 | Lesage et al. | |
| 2007/0096426 | A1 * | 5/2007 | McAndrews | 280/284 |
| 2007/0108725 | A1 | 5/2007 | Graney | |
| 2008/0007027 | A1 * | 1/2008 | McAndrews | 280/285 |
| 2008/0252040 | A1 * | 10/2008 | Colegrove et al. | 280/284 |
| 2008/0277900 | A1 * | 11/2008 | I | 280/283 |
| 2008/0303242 | A1 * | 12/2008 | O'Connor | 280/284 |
| 2009/0001686 | A1 * | 1/2009 | Currie | 280/285 |
| 2009/0072512 | A1 * | 3/2009 | Earle | 280/283 |
| 2009/0267316 | A1 * | 10/2009 | Gonzalez et al. | 280/275 |
| 2009/0267317 | A1 * | 10/2009 | Yang | 280/283 |
| 2009/0315296 | A1 | 12/2009 | Berthold | |
| 2010/0127473 | A1 * | 5/2010 | Cocalis et al. | 280/283 |
| 2010/0156066 | A1 * | 6/2010 | O'Connor | 280/283 |
| 2010/0264623 | A1 * | 10/2010 | Peterson | 280/283 |
| 2010/0276906 | A1 * | 11/2010 | Galasso et al. | 280/283 |
| 2011/0202236 | A1 * | 8/2011 | Galasso et al. | 701/37 |
| 2011/0227312 | A1 * | 9/2011 | Earle | 280/283 |
| 2011/0278818 | A1 * | 11/2011 | Talavasek et al. | 280/288 |
| 2012/0228850 | A1 * | 9/2012 | Tseng | 280/283 |
| 2013/0093160 | A1 * | 4/2013 | Alsop | 280/284 |
| 2013/0147152 | A1 * | 6/2013 | Paquin et al. | 280/281.1 |
| 2013/0214508 | A1 * | 8/2013 | Beale | 280/285 |
| 2014/0015220 | A1 * | 1/2014 | Talavasek | 280/275 |
| 2014/0117643 | A1 * | 5/2014 | Wrobleski | 280/275 |
| 2015/0001829 | A1 * | 1/2015 | Berthold | 280/284 |
| 2015/0069735 | A1 * | 3/2015 | Hoogendoorn et al. | 280/284 |

FOREIGN PATENT DOCUMENTS

| | | |
|---|---|---|
| DE | 29614967 U1 | 8/1996 |
| DE | 29614967 U1 | 10/1996 |
| DE | 19844430 A1 | 4/2000 |
| DE | 19959795 A1 | 9/2001 |
| DE | 20217875 U1 | 11/2002 |
| DE | 10066061 B4 | 9/2005 |
| DE | 60315903 T2 | 5/2008 |
| DE | 102010010317 A1 | 10/2010 |
| EP | 0538012 A1 | 4/1993 |
| EP | 0668209 A1 | 8/1995 |
| EP | 1975055 A1 | 1/2008 |
| GB | 2360497 A | 9/2001 |
| JP | 2008201364 A | 9/2008 |
| WO | 9743166 A1 | 11/1997 |

OTHER PUBLICATIONS

German Search Report dated Mar. 30, 2012 for German application No. 202011104974.8.

Chinese Office Action dated Oct. 9, 2015 for Chinese application No. 201280038113.X.

* cited by examiner

VEHICLE FRAME

BACKGROUND

1. Field of the Disclosure

The disclosure relates to a vehicle frame, in particular to a bicycle frame for mountain bikes or trekking bicycles.

2. Discussion of the Background Art

In particular with bicycles used under riding conditions that vary extremely, such as mountain bikes or trekking bicycles, it is common to provide a sprung rear frame, i.e. a rear frame that is pivotably connected with a main frame element. With such a frame, the main frame element is formed by a top tube, a down tube and a seat tube, while other frame geometries are conceivable. Under varying riding conditions, ranging from steep downhill slopes to steep uphill slopes, the load distribution between the front wheel and the rear wheel changes drastically. When riding on plane ground, about 70% of the weight force act on the rear wheel and only 30% act on the front wheel. On the other hand, when riding uphill, almost 100% of the weight act on the rear wheel so that the front wheel might even be lifted slightly off the ground. Similarly, when riding down steep slopes, it may happen that almost 100% of the weight are borne by the front wheel so that a lift-off of the rear wheel may occur.

With bicycles, such as mountain bikes, which comprise a damping element for damping the movement of the rear frame, the damping element is adjusted in such a manner that about 20-30% of the spring travel are provided as negative spring travel. This means that, given a static load by the weight of a driver, the damping element is compressed for about 20-30% of the total spring travel. Thereby, the rear frame will rebound when riding over uneven ground, such as over holes or the like. Comfort and traction are thereby improved. When riding uphill, such an adjustment of the negative spring travel results in an acute seat angle and thereby causes a displacement of the sitting position of the driver towards the rear wheel. This causes the front wheel to lift off even at rather gentle ascending slopes. Moreover, the frame is sensitive to driving influences. Driving influences can be suppressed by adjusting the compression damping, whereby, however, energy is converted into heat so that the power of the driver is not fully used to move the bicycle. Further, suppressing the driving influences does not cause a change in geometry so that the same is still unfavorable for riding uphill. Alternatively, an adjustment of the air pressure in the damping element could be made when riding uphill, with the air pressure having to be increased during a ride uphill. However, this means a considerable effort.

From U.S. Pat. No. 7,712,757, a mountain bike frame is known which comprises a main frame element and a rear frame connected with the same in an articulated manner. A damper element is pivotably connected with the rear frame at a first or upper connection point via a first rocker link. The lower or second connection point of the damper element is pivotably connected with the down tube via an intermediate element. The intermediate element or a second rocker link carries the main link bearing, i.e. the link bearing of the rear frame. Thus, the main link bearing is not connected directly with the main frame element, but is connected therewith only indirectly via the connection element.

Further, the structure described in U.S. Pat. No. 7,712,757 is provided with a spring element arranged between the connection element and the seat tube, by which spring element the lower or second connection point of the damper element can be shifted. Here, the second connection point is shifted automatically depending on the tension of the chain. The dependence of the damping behavior on the chain tension is often perceived by cyclists as being objectionable. This is true in particular when riding off-road when the rear frame moves rather frequently and strongly. Further, the stiffness of the frame is reduced by the displacement of the main link bearing into a moving damping element. Moreover, the solution described in U.S. Pat. No. 7,712,757 has the disadvantage that the overall weight of the frame is drastically increased thereby. Further, the solution described in U.S. Pat. No. 7,712,757 requires to significantly shift the lower or second connection point of the damping element to achieve a relevant influence on the damping effect or a relevant change of the damping or spring characteristic. As a result the components have to be accordingly solid, since displacements by more than 40 mm to 50 mm are required. Further, the connection element and the displacing element in the form of a spring have to guarantee the absorption of substantial forces so that a solid design of these components is required for this reason, too, whereby the overall weight of the frame is increased.

In the interest of hanging the frame geometry, it is further known from U.S. Pat. No. 6,877,591 to change the position of the second connection point connected with the main frame element. The second connection point is connected with the down tube via a fixing element and can be fixed in different positions. The connection position can be changed only by loosening the connection point using tools. Thus, changing the position of the second connection point is rather troublesome and, in particular, is impossible to accomplish while riding.

Further, an arrangement of a damping element between a sprung rear frame and the main frame element is known from GB 2 360 497. Here, the first connection point of the damping element with the rear frame is not formed by a rocker link connected with the main frame element, but is realized in an immediate manner. The second connection point of the damping element fixedly connected with the main frame element. For a change of the frame geometry, the first connection point may be shifted within a guiding slot. Again, this is a frame geometry that can be changed only with effort using tools and, in particular, cannot be varied while riding.

It is an object of the disclosure to provide a bicycle frame, in particular for mountain bikes and trekking bicycles that can be adapted to different riding situations in a simple manner.

SUMMARY

The bicycle frame of the present disclosure, which is particularly suited for mountain bikes or trekking bicycles, comprises a main frame element, as well as a rear frame pivotably connected therewith. The main frame element comprises in particular a top tube, a down tube and a seat tube, with other frame geometries also being possible. The rear frame is pivotably connected with the main frame element via a pivot axis that may be arranged near the bottom bracket shell, for example. Preferably, the rear frame comprises at least one, preferably two chain stays that are connected with the main frame element via a pivot axis or a main link bearing preferably at a position near the bottom bracket shell. Further, the rear frame preferably comprises two seat stays that are hinged to the at least one chain stay near the dropouts thereof. The seat stays extend from the dropouts of the chain stays towards the seat tube of the main frame element.

The rear frame, in particular the at least one seat stay of the rear frame, is indirectly or directly connected with the damping element via a first connection point, with an indirect connection with the interposition of a rocker link being preferred. Here, in particular the two seat stays are pivotably connected with a rocker link pivotably supported at the main frame element, in particular the seat tube. Further, it is possible to connect appropriately configured rocker links with the top tube or the down tube of the main frame element. In this preferred embodiment, the rocker link, which in particular has a generally triangular cross section in side view, is connected with the first connection point of the damping element. In this preferred embodiment, the rocker link thus has three hinge points, one being connected with the at least one seat stay, another being connected with the seat tube, the down tube or the top tube of the main frame element, and the third being connected with the first connection point of the damping element, possibly in an indirect manner. Of course, other designs of the rocker link and also other connections between the rear frame and the damping element are possible.

The damping element is connected with the main frame element, in particular with the seat tube of the main frame element, via a second connection point. The second connection point of the damping element may also be connected with the down tube or the top tube of the main frame element. Thus, the pivoting movement of the rear frame is dampened by the damping element during compression and, due to the adjustment of a negative spring travel, the damping element assists the rebound.

According to the disclosure, a displacing element is provided for a preferably substantially horizontal displacement of the first connection point of the damping element. Using the displacing element, the position of the first connection point and thus the position of the first damping element can be changed. A change of the damping element position causes a change in the frame characteristics. Due to the displacing element provided according to the disclosure, it is possible, in particular also while riding, to actively displace the first connection point. Thus, according to the disclosure, a change in frame geometry is possible in short time so that the frame geometry can quickly be adapted to the riding situation (uphill or downhill).

If necessary, a positional change of the second connection point can also be effected in addition to the positional change of the first connection point, while it being preferred according to the disclosure that only the position of the first connection point is adjustable by means of the displacing element. The second connection point is preferably arranged fixedly on the main frame element so that the damping element can only pivot about the second connection point. Possibly, the second connection point may also be connected indirectly with the main frame element via an intermediate element so that the second connection point is floatingly connected with the main frame element. With this structure, a positional change of the second connection point may occur due to the movement of the rear frame, wherein, according to the disclosure and in a preferred embodiment, the position of the same cannot be changed actively using a displacing element.

In particular, it is preferred that the first connection point is displaced substantially perpendicularly to the longitudinal axis of the damping element. The longitudinal axis of the damping element and the direction of displacement preferably include an angle ranging from 80° to 100°. By displacing the first connection point, the spring characteristic of the overall system formed by the rear frame and the damping element is changed.

It is particularly preferred that the first connection point of the damping element is connected with the rear frame by means of a rocker link, where the connection point connected with the rocker link is adapted to be displaced by means of the displacing element. Here, it is preferred that the first connection point is connected indirectly with the rocker link, especially with the interposition of a lever element.

For example, a displacing element is arranged such that it is oriented substantially vertically when in a standard position. Simply speaking, the weight force of the cyclist acts in the longitudinal direction of the damping element. In particular when riding uphill, this causes a rearward shifting of the sitting position and a frame setting unfavorable for riding uphill, in particular when the usual negative spring travel of 20-30% of the total spring travel has been set. According to the disclosure, with a damping element arranged in such a manner, a first connection point, i.e., for instance, the upper connection point of the damping element, is displaced forward when riding uphill. This has the effect that the cyclist causes a lesser compression of the damping element when riding uphill, i.e. the negative spring travel is reduced. In this position, the negative spring travel while riding uphill is only 8-12% of the total spring travel.

Thereby, the frame setting is clearly improved for riding uphill. If the first connection point does not only move along a circular path about the second connection point, but moves in such a manner that the distance between the connection points increases, an adjustment of the geometry is effected in addition that makes riding uphill easier. According to the disclosure, the overall change in geometry results from the difference between the negative spring travel and the actual new geometry in the unloaded state (when the cyclist is not yet sitting on the bicycle). In a preferred embodiment, the proportions of the geometry change caused (1) by the change of the SAG and (2) by the actual adjustment of the rear frame structure are about 50% each (or 40/60 or 60/40).

Thus, a displacement element provided according to the disclosure, which at least allows a displacement of the first connection point of the damping element, makes it possible to obtain a frame setting or a frame geometry adapted to the given riding situation.

The displacing element preferably is an electrically, hydraulically or pneumatically actuable displacing element. It is preferred to provide a mechanical spring element so that the compression of the spring element causes a storing of energy that can be used to displace the first connection point from a standard position (riding on plane ground and riding downhill) to an uphill position. Of course, a combination of the different modes is possible as well.

It is particularly preferred to provide a rocker link by which the rear frame is connected with the main frame element and the damping element. Here, in a preferred embodiment, the rocker link is arranged in particular at the seat tube. The rocker link is pivotable about this point, while a second hinge point of the rocker link can be connected with the seat stays of the rear frame and the third hinge point of the rocker link can be connected with the damping element. In a preferred embodiment, the position of this third hinge point can be shifted by means of the displacing element so that the damping element can be connected with the rocker link in at least two different positions.

In a particularly preferred embodiment of the disclosure, the rear frame is connected with the main frame element via a rocker link, the first hinge point of the rocker link being connected with the main frame part and the second hinge point of the rocker link being connected with the seat stays of the rear frame. In this particularly preferred embodiment, the damping element is not connected directly, but indirectly with the third hinge point of the rocker link. The connection is effected via a lever element. Here, the lever element is preferably fastened pivotably at the third hinge point and is fastened pivotably at the first connection point of the damping element. By pivoting the lever element about the third hinge point of the rocker link, the position of the first connection point is changed and thereby a change in the frame geometry and the damping characteristics is effected.

According to the disclosure, the lever element is pivoted about the third hinge point by means of the displacing element provided for changing the position of the first connection point. Here, the displacing element can be configured such that a pivoting of the lever element about the third hinge point is caused, for instance by rotating a pivot axis of the lever element. This may be achieved by the action of an electric motor on the pivot axis. For this purpose, the pivot axis could comprise an outer toothing, for example, on which an electromotively driven worm gear acts. In a particularly preferred embodiment, the displacing element is connected with the lever element at a distance from the pivot axis thereof, i.e. at a distance from the third hinge point. Thus, by varying the length of the displacing element, the lever element is pivoted and the position of the first connection point is changed thereby. In this context it is preferred that the displacing element is connected with the rocker link and the lever element or the first connection point.

In a particularly preferred embodiment the displacing element is configured such that the displacing element is adjustable or variable in length in its longitudinal direction. For this purpose, the displacing element may be configured as an electric, pneumatic or hydraulic displacing element or as a combination thereof.

In a preferred embodiment it is possible, by means of the displacing element, to shift at least the first connection point by at least 5 mm and in particular by at least 10 mm. Preferably, the shifting distance is less than 25 mm and in particular less than 20 mm. Hereby, a good frame setting can be effected already upon minor displacements of at least the first connection point.

In a particularly preferred development of the disclosure the displacing element is adapted to be locked in at least one position. This may be done in particular by means of a locking element manually adjustable by means of a lever or by a locking element adapted to be locked in some other manner. It is particularly preferred to actuate the locking element by means of an actuator means so that a remote actuation is possible. In this context it is preferred that the locking of the displacing element is effected through an actuator element adapted to be arranged on the handlebar of the bicycle, in particular an actuation lever or an actuation key. The locking element may be actuated via a cable or also hydraulically. An electrical actuation or an actuation by radio is also conceivable. For example, the displacing element may also be a displacing element driven by an electric motor so that a locking is possible by switching off the motor. Independent of the embodiment of the displacing element, it is preferred that a locking is possible at least in the two extreme positions, while a locking may preferably also be possible in one or a plurality of intermediate positions.

According to the disclosure, the possibility of an individual locking, in particular by means of a kind of remote control, considerably improves the riding comfort because of the possible individual adjustment of the frame characteristics.

By displacing at least the first connection point of the damping element as provided by the disclosure, the negative spring travel is changed. This is substantially due to the fact that the distance to the bearing point of the rocker link and thus the lever arm of the damper change with respect to the lever arm of the seat stay.

In a further preferred embodiment the displacing element comprises a spring element preferably acting in the direction of displacement. Here, the spring element can be provided in the form of a coil spring or an elastomeric member, as well as a pressure chamber filled with gas. Thereby, it becomes possible to store energy in the spring element. Thereafter, for instance by releasing the locking, the spring element relaxes so that an automatic displacement of at least the first connection point and thus a change of the position of the damping element are performed. Likewise, it is possible that an automatic activation of the displacing element is caused, for instance by a relaxation of the spring element provided in the displacing element. This is achieved, for example, by the cyclist lifting himself from the seat and thereby relieving the rear wheel. This causes a change of the position of the damping element towards a position with a shorter negative spring travel and a modified geometry of the rear frame. This setting has a positive effect when riding uphill.

Preferably, the spring element provided in the displacing element is compressed under a standard weight load, i.e. in the normal riding position which the rider assumes when riding on a substantially level ground. The energy stored may then be stored with the help of the locking element such that a consciously effected displacement of one of the two or of both connection points of the damping elements occurs only when the locking element is actively released.

In a preferred embodiment of the locking mechanism the same is designed such that an automatic locking always occurs at the two end positions. This may be achieved in a simple manner by means of a spring-loaded pin catching at the respective end positions. Thereby, an unintentional change of the position of the damping element is avoided. Should the displacing element comprise a hydraulic actuation element, for instance, the same may be locked by means of an electrically actuable magnetic valve.

In a particularly preferred embodiment the locking element comprises two fluid chambers that are in particular connected via a connection channel. A valve is arranged in the connection channel. A piston is arranged in one of the fluid chambers, by which piston the variation of the displacing element length and the resulting positional change of the first connection point are realized. By opening the valve, it is possible to displace this piston in the corresponding fluid chamber. Conveying the fluid, in particular a hydraulic oil, to and fro between the two fluid chambers could be done using a pump. It is preferred, however, that the fluid chamber that is not equipped with the piston acts on a chamber filled with gas or another compatible medium. When the piston is pushed into the corresponding fluid chamber and the fluid is conveyed into the other chamber, while the valve is open, the gas or the like will be compressed thereby. When the valve is closed, the displaceable piston is locked, since, despite the pressure built up by the gas pressure, the fluid cannot flow back into the first fluid chamber in which the piston is arranged. Likewise, opening the valve will result in the fluid flowing into this first fluid chamber and thus in the piston being pushed out. Thereby, it is possible to vary the length of the displacing element in the longitudinal direction thereof and thus, it is possible to displace the first connection point.

Thus, it is possible in a simple manner, in particular with the help of an actuator element provided at the handlebar, to open a corresponding valve. When the valve is open, the cyclist can cause a compression or relaxation of the compressible medium in the chamber by shifting his weight correspondingly. Thereby, the fluid, in particular the hydraulic oil, flows from one fluid chamber into the other fluid chamber and thereafter, the piston in the first fluid chamber is displaced correspondingly. This causes a positional change of the first connection point.

An activation of the valve, i.e. opening and closing the valve, could also be effected by a sensor system. The sensor system could comprise an inclination sensor, for example, so that a positional change of the first connection point is effected depending on the inclination. Possibly, the speed of the bicycle could also be considered in this context.

In a particularly preferred embodiment, the rear frame is directly connected with the main frame element via a main link bearing. Thus, the main link bearing is integrated in the main frame element or it is rigidly connected with the main frame element via an intermediate element. Thus, the main link bearing is preferably not moved when the displacing element is actuated. Therefore, the forces and moments introduced from the rear frame into the main frame element via the main link bearing do not have to be transmitted via an intermediate element. Thereby, the weight of the bicycle frame can be reduced considerably, in particular with respect to the configuration of the rear frame described in U.S. Pat. No. 7,712,757.

The disclosure is described hereunder with reference to a preferred embodiment and to the accompanying drawings.

DETAILED DESCRIPTION OF THE PREFERRED EMBODIMENT

Figure 1:
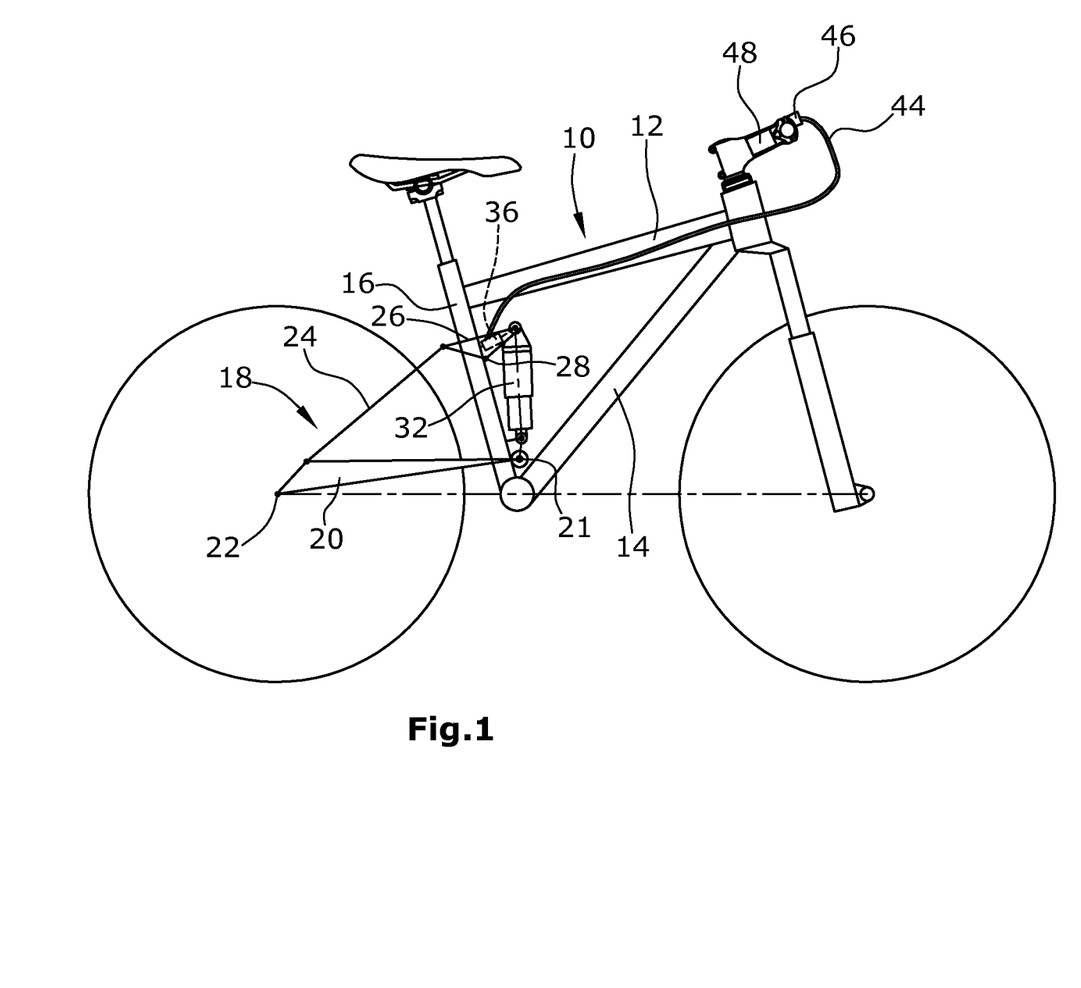
FIG. 1 illustrates a much simplified schematic side elevational view of a mountain bike.

With reference to FIG. 1, a possible configuration of a main frame element, as well as of a rear frame will be described with reference to an example in connection with a damping element hinged thereto by means of a rocker link. Various possible configurations are illustrated in particular in FIGS. 6-11.

Figure 2:
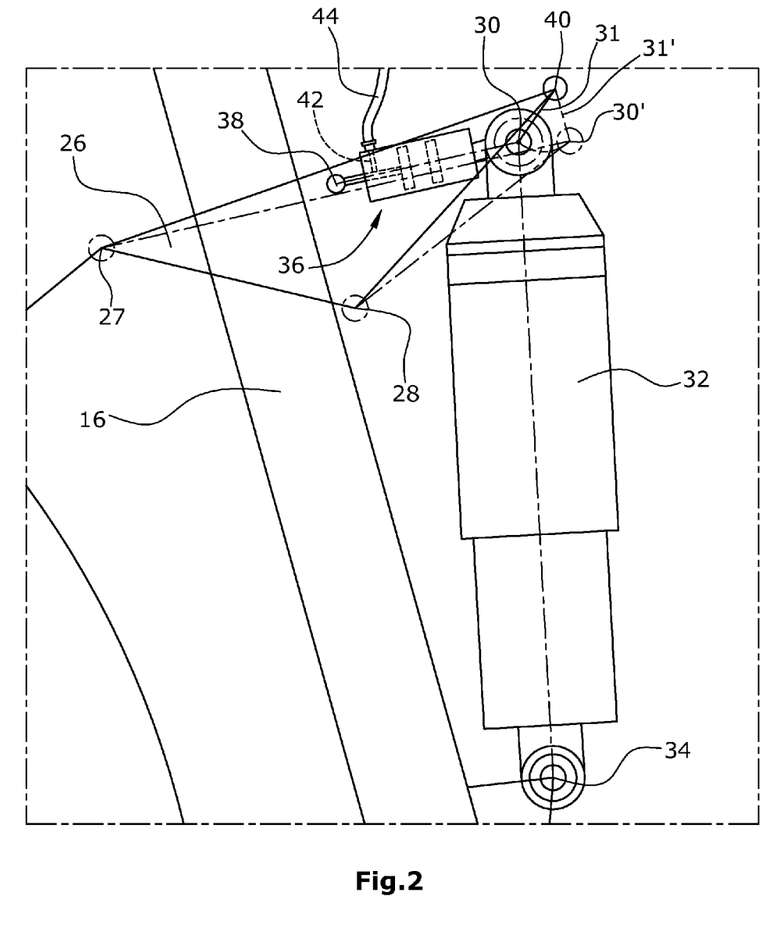
FIG. 2 illustrates a schematic side elevational view of mounted damping element according to the Figure.

A mountain bike comprises a main frame element 10 which, in the embodiment illustrated, includes a top tube 12, a down tube 14 and a seat tube 16. The main frame element 10 is connected with a rear frame 18. The rear frame 18 has two chain stays 20 at the dropouts 22 of which the rear wheel axle. In this portion of the chain stays 20, two seat stays 24 are arranged that extend towards the seat tube 16. The seat stays 24 are connected with the dropouts of the chain stays 20 and, at a second hinge point 27, are pivotably connected with a rocker link 26 schematically illustrated as a triangle. The rocker link 26, schematically illustrated as a triangle in the Figures, is pivotably connected with the seat tube 16 via a first hinge point 28 (FIG. 2). A damping element 30 has a first connection point 30 (FIG. 2) that is connected with a third hinge point 40 of the rocker link 26 via a lever element 31. A second connection point 34 of the damping element 32 is also connected with the seat tube 16 via a rigid connection element or the like.

In all embodiments illustrated the first connection point 30 is variable in position. For this purpose, a displacing element 36 is provided which, in the embodiment illustrated, is substantially integrated in the rocker 26. The displacing element 36 is fixed to the rocker link 26 or the seat tube 16 by one end point 38 (FIG. 2). The other end of the displacing element 36 is connected with the first connection point 30.

In the position illustrated in FIG. 2, the damping element 32 is under standard weight load, where a relatively large negative spring travel can be set. When riding uphill, the upper or first connection point 30 is displaced to the right in FIG. 2. This is effected by a decompression or relaxation of a displacing element configured as a pneumatic piston in FIG. 2. Hereby, the first connection point 30 is pivoted about the third hinge point 40 so that the connection point 30 is pivoted to the position 30'. This causes a tilting of the damping element 32 about the second connection point 34 to the right-hand side in FIG. 2.

In addition to a displacement of the first connection point 30, a displacement of the second connection point 34 would be possible as well.

In a particularly preferred embodiment, a kind of remote control for the displacing element 36 is provided. In the embodiment illustrated, the displacing element 36 comprises a locking element 42 (FIG. 2) for this purpose, which may be a pin-shaped locking element, for example. The locking element 42 is actuable via an actuation means. For example, the actuation means comprises an actuator element 46 (FIG. 1) in the form of a lever that is arranged on a handlebar 48. The actuator element 46, which is configured in particular as a lever, is connected with the locking element 42 via a transmission element 44 which in the embodiment illustrated is a cable.

Similarly, the actuation can be effected electrically or also by radio. In this case, a key may be arranged on the handlebar 48 as the actuator element. For example, the displacing element may also be configured as an electric servomotor, for example in connection with a correspondingly designed sliding guide for the displacement of the first connection point 30.

Figure 3:
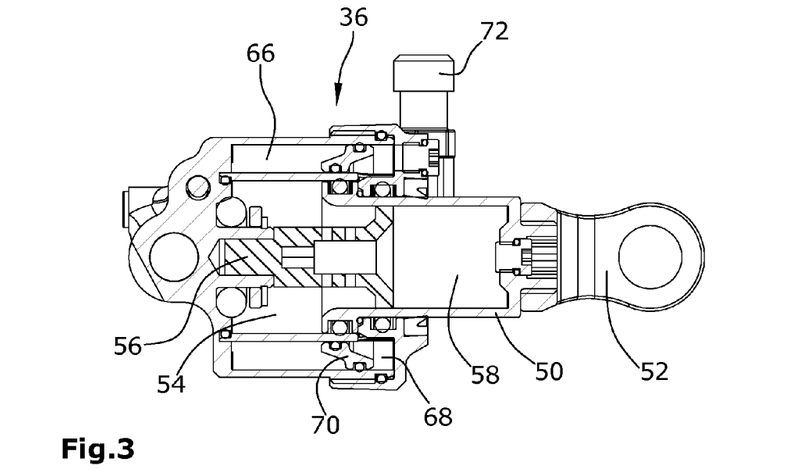
FIG. 3 is a schematic sectional view of a preferred embodiment of the displacing element in the extended position.

It is particularly preferred to configure the displacing element 36 as a pneumatic and/or hydraulic element. A particularly preferred embodiment of such a displacing element will be described hereinafter with reference to FIGS. 3 to 5.

This preferred embodiment of the displacing element 36 comprises a piston 50 that is connected with a first connection point 50 of the damping element 32 via a connection element 52. The piston 50 is arranged in a first chamber 54 filled with hydraulic oil. The first fluid chamber 54 is connected with a second fluid chamber 66 via a bore 60 (FIG. 5), a channel 62 and a further bore 64. The second fluid chamber 66 surrounds the first fluid chamber 54 in a circularly annular manner. Adjoining the second fluid chamber 66 in the longitudinal direction is a gas chamber 68, filled in particular with air. An annular separation element 70 is arranged between the second fluid chamber 66 and the gas chamber 68. A non-illustrated channel connects the gas chamber 68 with a valve 72 via which pressurized air can be supplied to the gas chamber 68.

Figure 5:
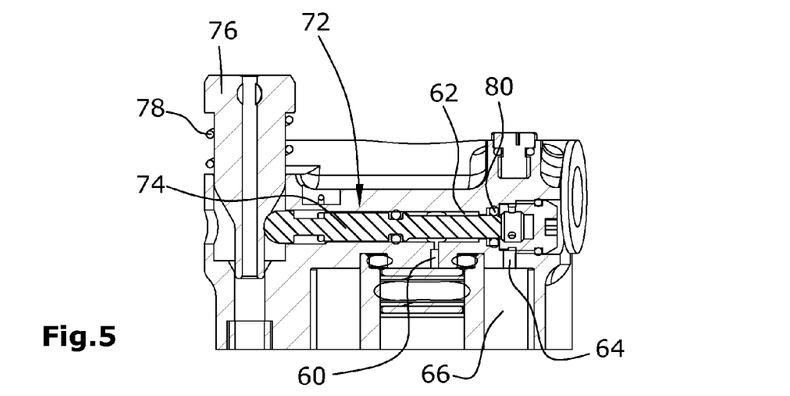
FIG. 5 is a schematic partial sectional view of the valve arranged in the displacing element of FIGS. 3 and 4, and FIGS. 6-11 are schematic illustrations of different rear frame structures with different arrangements of the damping element.

The displacing element 36 is actuated by means of a valve 72 visible in FIG. 5, which valve takes the form of a needle valve. In the position illustrated, a valve needle 74 closes the channel 62 connected with the outer fluid chamber. Using a valve actuator element 76, the valve needle 74 can be displaced inward. The valve actuator element 76 is connected with a non-illustrated cable which in turn is connected with the actuator element 46 that is mounted in particular on the handlebar 48 (FIG. 1). In FIG. 5, the cable extends to the left so that, by pulling on the cable, the valve actuator element 76 is moved to the left against a force applied by a coil spring 78. Thereby, the valve needle 74 is displaced inward. The inward directed displacement of the valve needle 74 causes a displacement of the sealing ring 80 connected with the valve needle. Thereby, the channel 62 is opened so that fluid can flow through the opening 60 into the channel 62 and through the opening 64. It is thereby possible to move the piston 50 to the left in FIG. 3 or to push it into the displacing element 36. This is effected through the body weight of the cyclist. When the piston 50 is pushed in, the hydraulic fluid flows from the first fluid chamber through the opening 60 into the channel 62 and further through the opening 64 into the second, outer fluid chamber 66. This causes a displacement of the annular separation element 70 to the right in FIG. 3 and a compression of the gas in the gas chamber 68.

As soon as the actuator element 46 (FIG. 1) is released again, the coil spring 78 (FIG. 5) moves the valve actuator element 76 to the right in FIG. 5. Due to the counter pressure prevailing, the valve needle 74 is pushed back to the position illustrated in FIG. 5. Thus, the displacing element or the piston 50 of the displacing element is locked in the retracted position.

Figure 4:
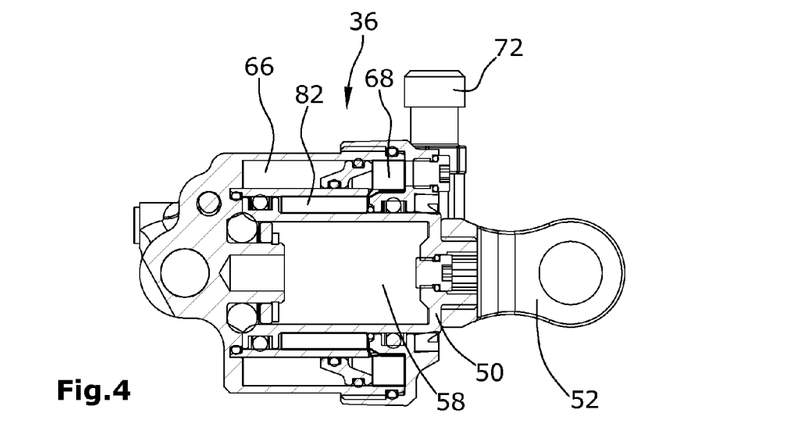
FIG. 4 is a schematic sectional view of a preferred embodiment of the displacing element in the retracted position.

In the retracted position illustrated in FIG. 4, increased pressure prevails in the gas chamber 68. As illustrated in FIG. 4 by the edges, the gas chamber 68 is further connected with an annular chamber 82 surrounding the piston 50. The prestressed air in the chamber 82 counteracts the rebounding of the frame in the event of tensile loads caused by dynamic rebound movements of the frame. It would be insufficient to only close the hydraulic valve, since the oil outgases as soon as the hydraulic liquid is subjected to a vacuum. As a result, the piston would rebound unintentionally, depending on the dynamic rebounding speed of the rear frame.

For a displacement of the piston 50 from the retracted position (FIG. 4) to the extended position (FIG. 3), the valve 72 is opened again as described above. Due to the pressure prevailing in the gas chamber 68, fluid is pressed from the second, outer fluid chamber 66 into the channel 62 via the opening 60 and into the first, inner fluid chamber 54, when the valve 72 is open. This causes an outward directed movement of the piston 50 and thus causes a displacement of the first connection point 30 of the damper 32.

In the various embodiments illustrated in FIGS. 6 to 11, similar and identical parts bear the same reference numerals. All embodiments comprise a rocker link 26 that, as explained above, is connected with the first connection point 30 of the damper 32 via the displacing element 36. In all embodiments, the identical, above-described principle of a positional change of the first connection point 30 is realized.

All embodiments always cause a displacement of the first connection point 30 and thus causes a change in the frame geometry. Depending on the position of the damper 32, a change of the inclination of the seat tube 16 and thus a change of the position of the seat is effected. Further, the height of the bottom bracket 84 changes as a function of the position of the damper 32. This causes a change in ground clearance.

Figure 6:
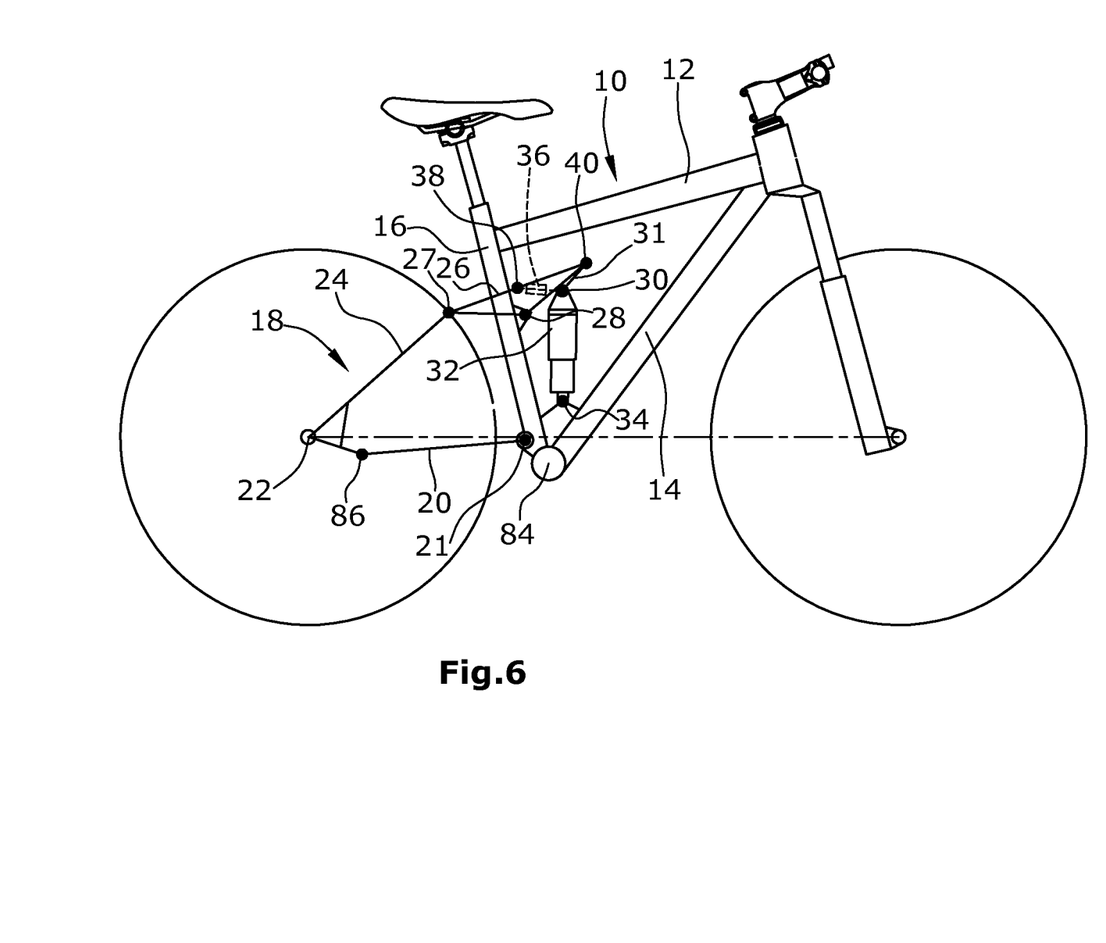

In FIG. 6 the rear frame 18 is configured as a four-pivot system with a rear frame pivot below the rear wheel axle and with a stationary damper 32. Here, the chain stays 20 are connected with the main frame element 10 via a pivot 21 at the bottom bracket. Another pivot 86 is arranged in the chain stays 20. In the region of the dropouts 22, the rear frame is rigid and is further connected with the second hinge point 27 of the rocker link 26 via the seat stays 24. The second connection point 34 of the damper 32 is pivotably connected with the main frame element near the down tube 14.

Figure 7:
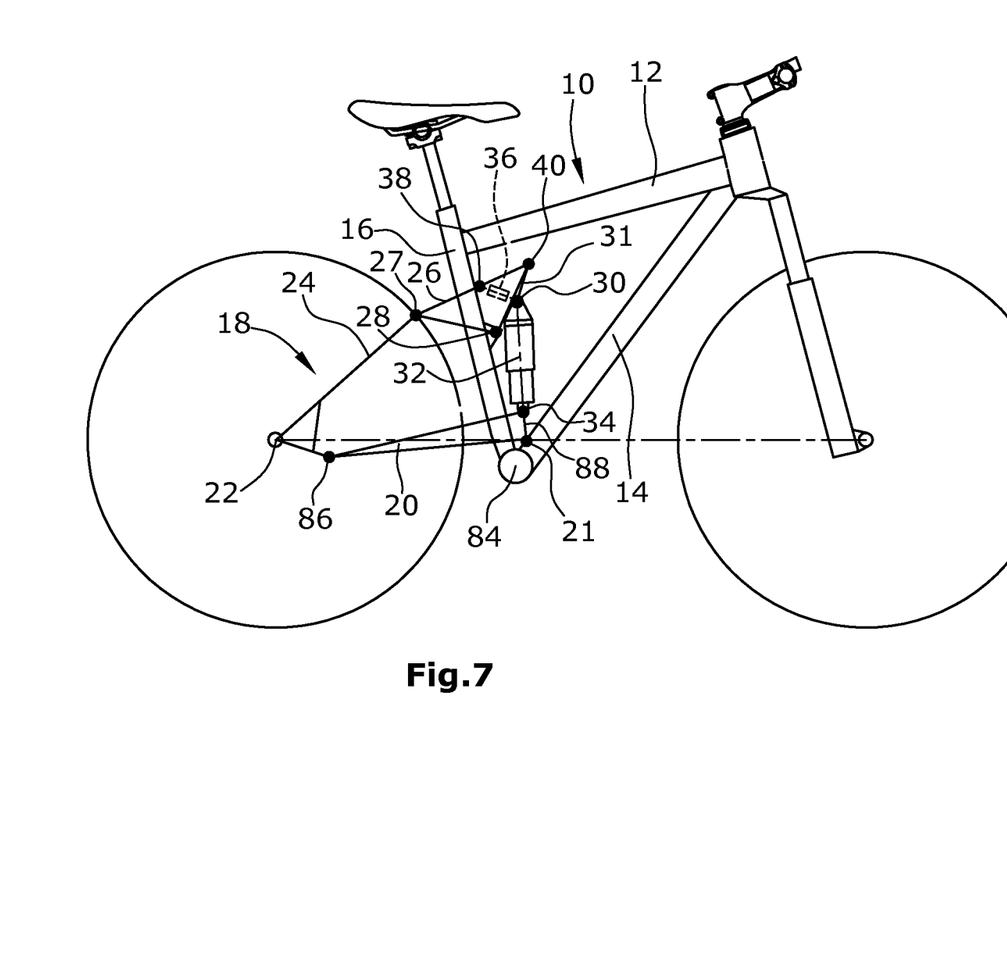

The embodiment illustrated in FIG. 7 is similar to the embodiment illustrated in FIG. 6, differing therefrom in that the second connection point of the damper 32 is not fixedly connected with the frame element 10, but is arranged for displacement with respect to the frame element 10. For this purpose, the connection point 34 is connected with the main link bearing 21 through a web-like intermediate element 88. The chain stay 20 is connected both with the second connection point 34 and the main link bearing 21.

Figure 8:
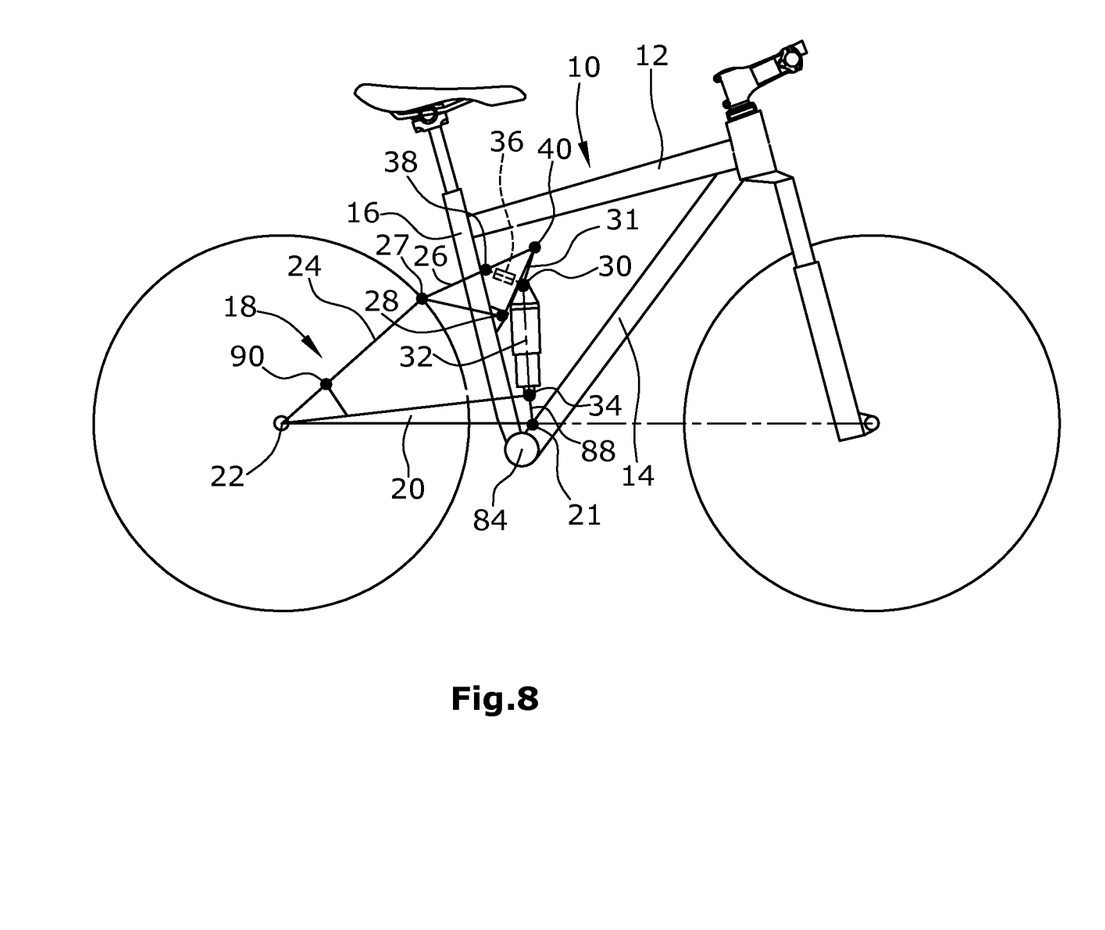

In the embodiment illustrated in FIG. 8, the connection of the second connection point 34 is connected with the main link bearing 21 in a floating manner via a web-shaped intermediate element 88, as in FIG. 7. With this embodiment, no pivot is provided in the chain stays 20. Instead, an additional pivot 90 is provided in the seat stays 24 so that the rear frame structure illustrated is a so-called supported single-pivot system.

Figure 9:
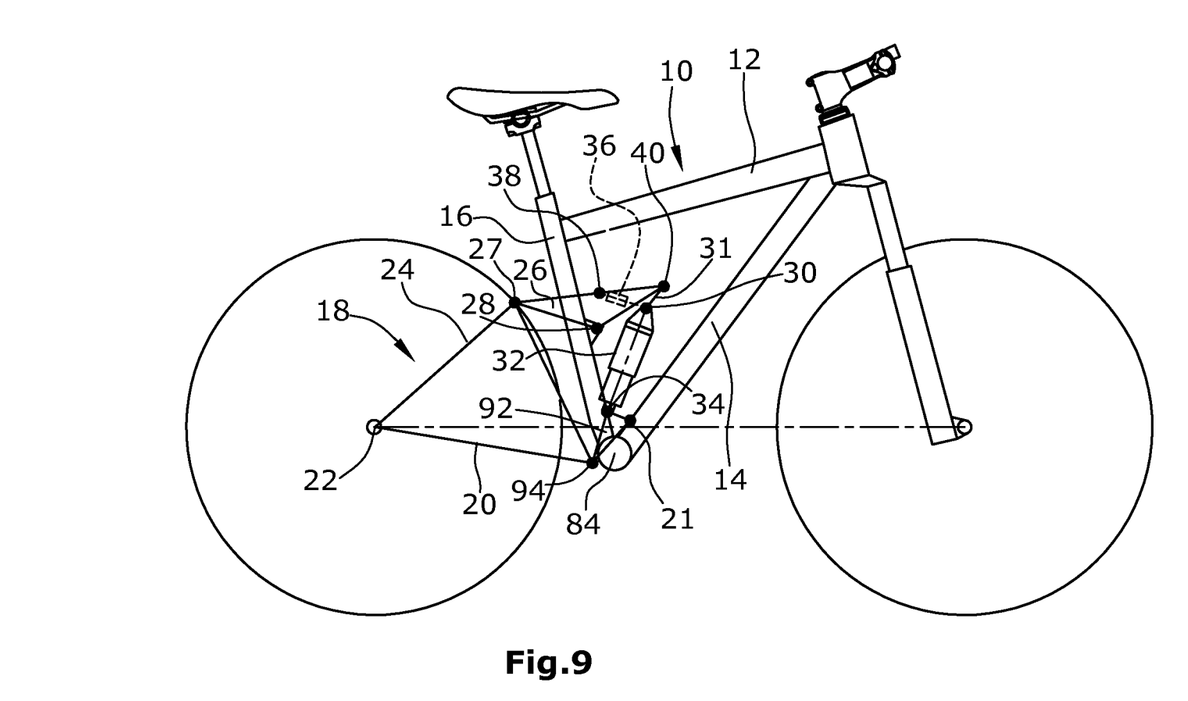

The rear frame structure illustrated in FIG. 9 is a so-called VPP rear frame structure. Here, the second connection point 34 is articulately connected with the main link bearing 21 and to a rear frame pivot 94 via a triangular intermediate element 92. The rear frame pivot 94 is further connected with rigid chain stays 20. The seat stays 24 themselves are connected with the dropouts 22 and the second hinge point 27 of the rocker link 26 without the provision of a pivot.

Figure 10:
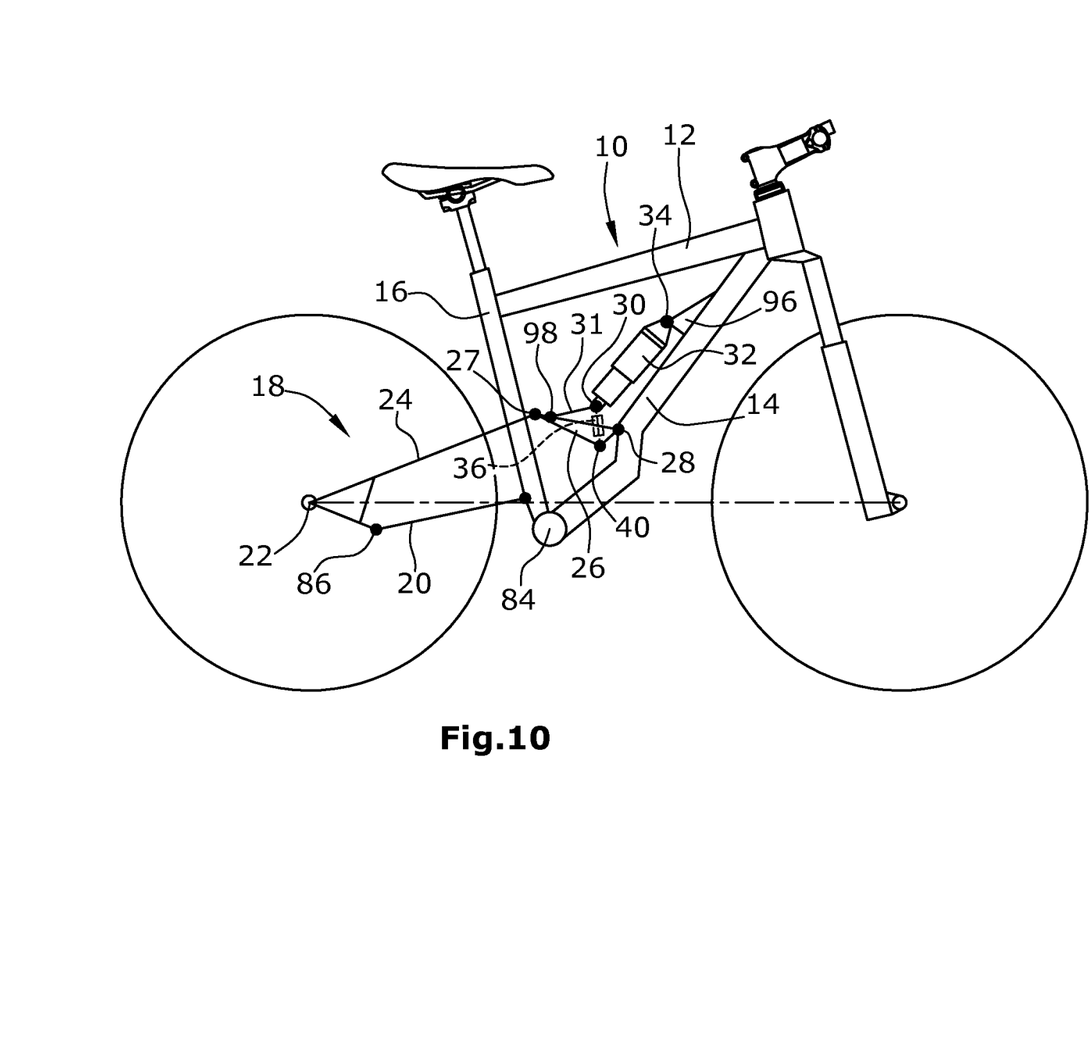

In the embodiment illustrated in FIG. 10, the damper 32 is arranged substantially parallel to the down tube. The second connection point 34 is fixedly connected with the down tube 14 through a connection element 96. Correspondingly, the rocker link 26 is also connected with the down tube 14 via the first hinge point 28. The second hinge point 27 of the rocker link 26 is connected with the chain stays 24. The displacing element 36 is also integrated in the rocker link 26. In the embodiment illustrated, the element is connected with the rocker link 26 via the third hinge point 40. Further, according to the structure of the disclosure, an auxiliary lever 31 is connected both with the first connection point 30 of the damper 32 and with the rocker link 26. In the embodiment illustrated, this is effected through an auxiliary bearing 98. For the rest, the rear frame is designed as a four-pivot system, as described with reference to FIG. 6, so that a pivot 86 is provided in each chain stay 20, respectively.

Figure 11:
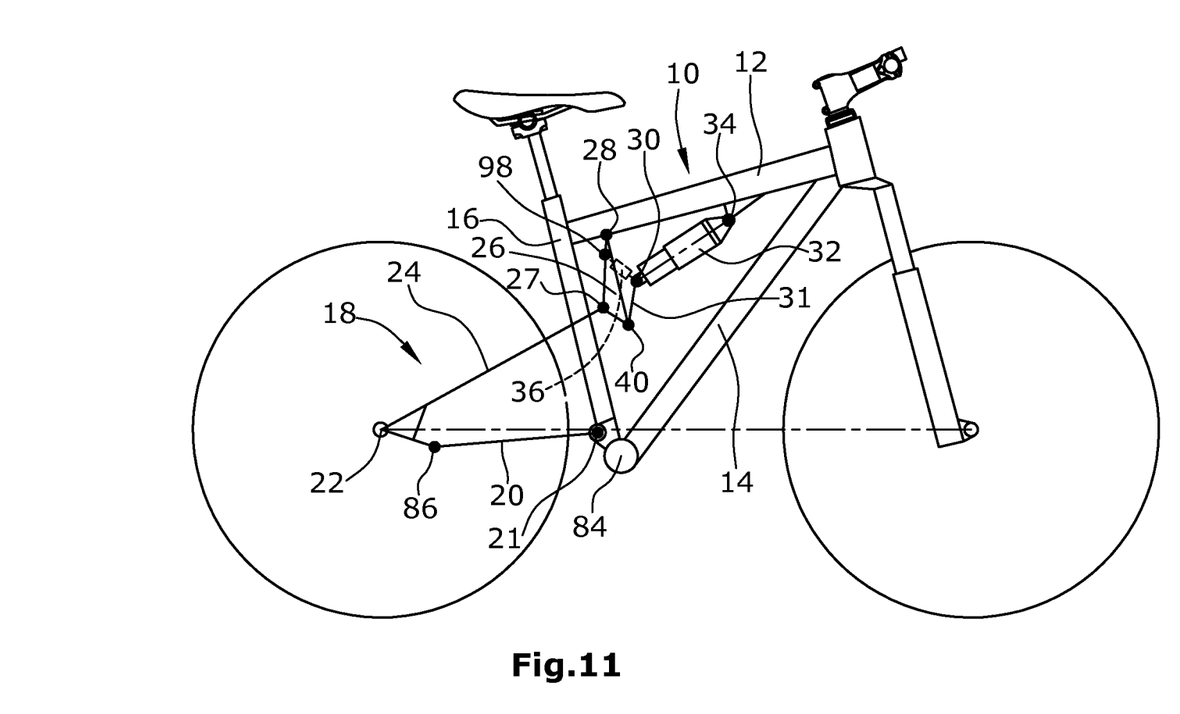

Similar to the embodiment illustrated in FIG. 10, the damper 32 can also extend substantially parallel to the top tube 12. Here, the rocker link 26 is also fastened to the top tube 12 via its first hinge point 28. The second hinge point 27 is again connected with the chain stays 24. The auxiliary lever 31 is connected with the first connection point 30 of the damper 32 as well as with the third connection point 40 of the rocker link 26. The displacing element 36 is connected with the rocker link 26 and the first connection point 30 through an auxiliary bearing 98.

The invention claimed is:

1. A bicycle frame comprising:
   a rear frame pivotably connected with a main frame element,
   a damper element arranged between the rear frame and the main frame element, the damping element being connected with the rear frame via a first connection point with a rocker link, the first connection point is connected with the rocker link via a lever element, and the damping element being connected with the main frame element via a second connection point, and
   a displacing element for changing a position of the damping element,
   wherein the displacing element is connected with the first connection point for changing the position thereof, and
   wherein the lever element is rotatable relative to the rocker link around a common connection point.

2. The bicycle frame of claim 1, wherein the rocker link is arranged in a pivotable manner at the main frame element.

3. The bicycle frame of claim 2, wherein the displacing element is connected with the rocker link.

4. The bicycle frame of claim 1, wherein the displacing element causes a displacement of at least the first connection point by at least 5 mm.

5. The bicycle frame of claim 1, wherein the displacing element acts on the lever element to change the position of the first connection point.

6. The bicycle frame of claim 1, wherein the displacing element is connected with the rocker link and the lever element.

7. The bicycle frame of claim 1, wherein the displacing element is variable in length in order to change the position of the first connection point.

8. The bicycle frame of claim 1, wherein, for changing the position of the first connection point, the displacing element comprises a spring element acting in a direction of displacement.

9. The bicycle frame of claim 8, wherein, when the rear frame is loaded with weight, the spring element causes a displacement of the damping element to a position with a smaller negative spring travel and/or a change in a geometry of the rear frame.

10. The bicycle frame of claim 8, wherein the spring element is compressed under a standard weight load.

11. The bicycle frame of claim 1, wherein the displacing element is adapted to be locked at least in one position by a locking element.

12. The bicycle frame of claim 11, wherein the locking element comprises two fluid chambers connected with each other through a valve.

13. The bicycle frame of claim 12, wherein one of the fluid chambers acts on a spring element configured as a gas chamber.

14. The bicycle frame of claim 11, wherein the valve of the locking element is connected with an actuation device for remote actuation.

15. The bicycle frame of claim 14, wherein the actuation device is an actuator element for mounting on a handlebar.

16. The bicycle frame of claim 15, wherein the actuation device comprises a transmission element connected with the actuator element and the locking element.

17. The bicycle frame of claim 1, further comprising a main link bearing connecting the rear frame with the main frame element.

18. The bicycle frame of claim 1, wherein the displacing element is adapted to be locked at least in both extreme positions by a locking element.

* * * * *